(12) United States Patent
Li et al.

(10) Patent No.: US 9,852,508 B2
(45) Date of Patent: Dec. 26, 2017

(54) IMAGE DATA GENERATING METHOD AND APPARATUS

(71) Applicant: Hisense Mobile Communications Technology Co., Ltd., Qingdao, Shandong (CN)

(72) Inventors: Bing Li, Shandong (CN); Changsheng Zhou, Shandong (CN); Sanfeng Yan, Shandong (CN)

(73) Assignee: Hisense Mobile Communications Technology Co., Ltd., Qingdao, Shandong (CN)

( * ) Notice: Subject to any disclaimer, the term of this patent is extended or adjusted under 35 U.S.C. 154(b) by 0 days.

(21) Appl. No.: 15/017,910

(22) Filed: Feb. 8, 2016

(65) Prior Publication Data

US 2016/0241781 A1    Aug. 18, 2016

(30) Foreign Application Priority Data

Feb. 15, 2015 (CN) .......................... 2015 1 0082484

(51) Int. Cl.
*H04N 5/232* (2006.01)
*G03B 13/00* (2006.01)
(Continued)

(52) U.S. Cl.
CPC ......... *G06T 7/0081* (2013.01); *H04N 5/2356* (2013.01); *H04N 5/23212* (2013.01)

(58) Field of Classification Search
CPC .......................... H04N 5/2226; H04N 5/2356
(Continued)

(56) References Cited

U.S. PATENT DOCUMENTS 6,636,298 B1 * 10/2003 Bachelder .......... G01N 21/8806
356/73.1
2009/0169122 A1 * 7/2009 He ..................... H04N 5/23212
382/238
(Continued)

FOREIGN PATENT DOCUMENTS

CN    102984530 A1    3/2013
CN    103795933 A     5/2014
(Continued)

OTHER PUBLICATIONS

China Patent Office Opinion dated Jan. 20, 2017 for China Patent Application No. 201510082484.3, Chinese language (6 pp.).
(Continued)

*Primary Examiner* — Anthony J Daniels
(74) *Attorney, Agent, or Firm* — Brinks Gilson & Lione (57) ABSTRACT

The present disclosure relates to a image data generating method and device. The device may be configured to obtain a plurality of frames of images of a scene including at least one object, each of the plurality of frames of images is associated with a character distance of a plurality of character distances of the electronic device. For each of the plurality of frames of images, device may determine a target image area, wherein the target image area is an image area on which an object in the scene is sharply focused; and set a focus area in the target image area. Finally, the device may generate an all-focused image by combining the plurality of frames of images, wherein each of the at least one object is sharply focused.

14 Claims, 2 Drawing Sheets

(51) Int. Cl.
*G06T 7/00* (2017.01)
*H04N 5/235* (2006.01)

(58) Field of Classification Search
USPC .................................................. 348/345, 353
See application file for complete search history.

(56) References Cited

U.S. PATENT DOCUMENTS

| | | | | |
|---|---|---|---|---|
| 2009/0310885 | A1* | 12/2009 | Tamaru | H04N 5/23212 382/275 |
| 2010/0265346 | A1* | 10/2010 | Iizuka | G06T 5/50 348/218.1 |
| 2013/0050564 | A1* | 2/2013 | Adams, Jr. | G06T 5/50 348/345 |
| 2013/0308036 | A1* | 11/2013 | Peng | H04N 5/2258 348/345 |
| 2014/0010476 | A1* | 1/2014 | Deng | H04N 5/23232 382/284 |
| 2015/0156417 | A1* | 6/2015 | Kawai | H04N 5/2258 348/208.1 |
| 2015/0279012 | A1* | 10/2015 | Brown | G06T 5/003 382/284 |
| 2015/0281592 | A1* | 10/2015 | Sarkar | H04N 5/23232 348/239 |

FOREIGN PATENT DOCUMENTS

| | | |
|---|---|---|
| CN | 103795934 A | 5/2014 |
| CN | 104079812 A | 10/2014 |
| CN | 104104869 A | 10/2014 |

OTHER PUBLICATIONS

China Patent Office Search Report dated Jan. 12, 2017 for China Patent Application No. 201510082484.3, Chinese language (2 pp.).

Hou, Wen-Jun et al, "Auto-Focusing Algorithm for Iris Imaging System," Opto-Electronic Engineering, vol. 35, No. 6, Jun. 2008, Abstract only (1 pp.).

Pentland, Alex Paul, "A New Sense for Depth of Field," IEEE Transactions on Pattern Analysis and Machine Intelligence, vol. PAM 1-9, No. 4, Jul. 1987, pp. 523-531 (9 pp.).

\* cited by examiner

IMAGE DATA GENERATING METHOD AND APPARATUS

PRIORITY STATEMENT

This application claims the priority benefit of Chinese Patent Application No. 201510082484.3 filed on Feb. 15, 2015, the disclosure of which is incorporated herein in its entirety by reference.

BACKGROUND

Technical Field

The present disclosure relates to the field of image processing technologies, and in particular, to an image data generating method and an image data generating apparatus.

Related Art

With the rapid development of science and technology, electronic devices have become an indispensable part of people's lives. That being said, electronic devices are widely popularized, and also gain a higher use rate in various aspects of people, for example, work, studies, and daily communication.

For an electronic device that can make an image, when a user needs to make the frame of image data about a service object, an image application needs to be started to drive imaging hardware for production in an electronic device (e.g., a camera or a smart phone). When the user is not satisfied with the acquired image data, another frame of image data about the service object needs to be made again, and the image application needs to be started again to drive the imaging hardware. The operations are complicated and time-consuming.

SUMMARY

Through exemplary embodiments, the present disclosure provides a technical solution of an image data generating method, so as to obtain an all-focused image of a scene that includes objects at different distance from an image taking apparatus.

According to an aspect of the present disclosure, an electronic device may comprise imaging hardware; a storage medium including a set of instructions for generating image data; and a processor in communication with storage medium. When executing the set of instructions, the processor is directed to drive the imaging hardware to: obtain a plurality of frames of images of a scene including at least one object, each of the plurality of frames of images is associated with a character distance of a plurality of character distances of the electronic device. For each of the plurality of frames of images, the processor may determine a target image area, wherein the target image area is an image area on which an object in the scene is sharply focused; set a focus area in the target image area. Finally, the processor may generate an all-focused image by combining the plurality of frames of images, wherein each of the at least one object is sharply focused.

According to another aspect of the present disclosure, a method for generating image data may comprise driving imaging hardware of an electronic device to detect a plurality of frames of depth of field image associated with a plurality of character distances. For each of the plurality of frames of the depth of field image, the method may comprise obtaining a plurality of frames of images of a scene including at least one object, each of the plurality of frames of images is associated with a character of a plurality of character distances of the electronic device. Further, for each of the plurality of frames of images, the method may comprise determining a target image area, wherein the target image area is an image area on which an object in the scene is sharply focused; setting a focus area in the target image area. Finally, the method may comprise generating an all-focused image by combining the plurality of frames of images, wherein each of the at least one object is sharply focused.

Compared with the prior art, the exemplary embodiments of the present disclosure have the following advantages:

In the exemplary embodiments of the present disclosure, imaging hardware is driven to detect the frame of or the plurality of frames of depth of field image by means of one or more character distances, so as to find one or more target image areas; focus areas are respectively set in the one or more target image areas; and the imaging hardware is driven to generate the frame of or the plurality of frames of image data in one shot. In this process, a user just needs to complete a generation operation once to make a selection on different character distances in image data without performing operations of starting an image application and driving imaging hardware again, which greatly improves operational simplicity and reduces time taken.

DETAILED DESCRIPTION

To make the foregoing objectives, characteristics, and advantages of the present disclosure more obvious and comprehensible, the present disclosure is further described in detail below with reference to the accompanying drawings and specific implementation manners.

Although an auto focusing function has been widely applied, owing to various factors such as defects of an auto focusing algorithm, hand trembling, a selection on a focus area, it is easy to make generated image data unsatisfactory, and make problems such as a blurred whole picture, or some unreasonable focus areas, or an unhighlighted image key point often arise.

For the problems, with comprehensive consideration into processing capabilities of a current platform, one of core concepts of embodiments of the present disclosure is provided. That is, in an operation of generating image data once, a pan-focus generating method of acquiring multiple images that focus on different depth of field objects, so as to be selected by a user after the picture is taken, so that a function of generating image data first and focusing afterward is implemented, and a problem of failed image data generation caused by a reason of focusing is greatly reduced.

Figure 3:
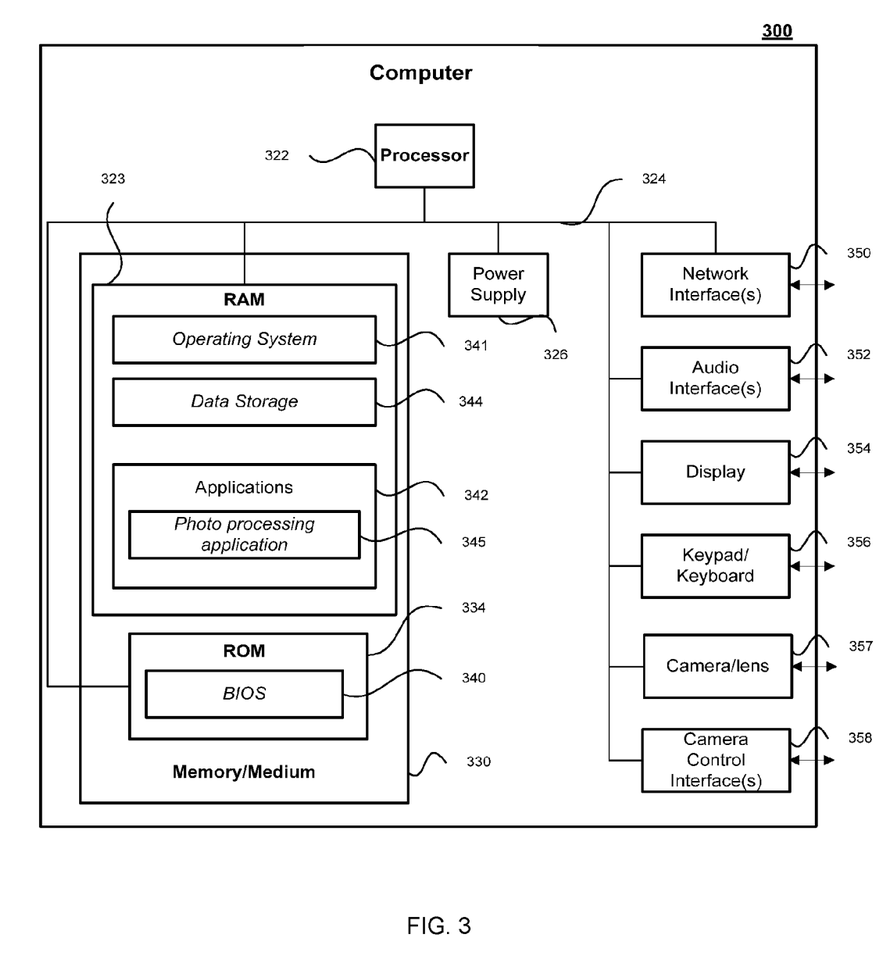
FIG. 3 is a schematic diagram illustrating an example embodiment of an apparatus embodiment for selecting target image data.

FIG. 3 is a schematic diagram illustrating an example embodiment of an apparatus embodiment for selecting target image data as introduced in the present disclosure. The apparatus may execute methods and software systems introduced in the present disclosure. An apparatus 300 may be a computing device capable of executing a software system.

The apparatus 300 may, for example, be a device such as a personal desktop computer or a portable device, such as a camera, a laptop computer, a tablet computer, a cellular telephone, or a smart phone.

The apparatus 300 may vary in terms of capabilities or features. Claimed subject matter is intended to cover a wide range of potential variations. For example, the apparatus 300 may include an image processing hardware, such as a camera and/or a webcam. It may also include a keypad/keyboard 356 and a display 354, such as a liquid crystal display (LCD), or a display with a high degree of functionality, such as a touch sensitive color 2D or 3D display. In contrast, however, as another example, a web-enabled apparatus 300 may include one or more physical or virtual keyboards, and mass storage medium 330.

The apparatus 300 may also include or may execute a variety of operating systems 341. The apparatus 300 may include or may execute a variety of possible applications 342, such as a photo processing application 345 to process images taken from a camera and/or a lens 357. An application 342 may enable communication with other devices via a network, such as communicating with another computer or apparatus 300 via a network.

Further, the apparatus 300 may include one or more non-transitory processor-readable storage media 330 and one or more processors 322 in communication with the non-transitory processor-readable storage media 330. For example, the non-transitory processor-readable storage media 330 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the apparatus 300 configured to conduct operations and/or method steps described in the present disclosure. The one or more processors may be configured to execute the sets of instructions and perform the methods and/or operations in example embodiments of the present disclosure.

Merely for illustration, only one processor will be described in apparatuses that execute operations and/or method steps in the following example embodiments. However, it should be note that the apparatuses in the present disclosure may also include multiple processors, thus operations and/or method steps that are performed by one processor as described in the present disclosure may also be jointly or separately performed by the multiple processors. For example, if in the present disclosure a processor of an apparatus executes both step A and step B, it should be understood that step A and step B may also be performed by two different processors jointly or separately in the apparatus (e.g., the first processor executes step A and the second processor executes step B, or the first and second processors jointly execute steps A and B).

Figure 1:
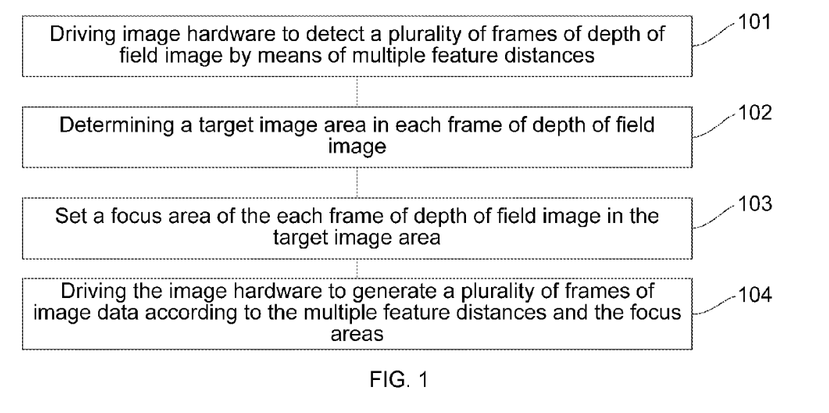
FIG. 1 is a flowchart of steps in an exemplary embodiment of an image data generating method according to the present disclosure.

FIG. 1 shows a flowchart of steps in an exemplary embodiment of an image data generating method according to the present disclosure. The method may be implemented as a set of instructions and stored in the storage medium 330 of the apparatus 300. The processor 322 may execute the set of instructions to perform operations of the method. The operations may include:

Step 101: Driving imaging hardware to detect a plurality of frames of depth of field image by means of one or more character distances.

Here, the apparatus 300 may be an electronic device having the imaging hardware. The electronic device may specifically include a mobile phone, a tablet computer, a personal digital assistant (PDA), a laptop computer, or the like, which is not limited in this embodiment of the present disclosure. These electronic devices may support operating systems including Windows, Android, IOS, WindowsPhone, or the like, and may generally run an image application of the imaging hardware.

In an exemplary implementation, the imaging hardware may have an image sensor and an optical element, where the optical element may transmit optical image information to the image sensor, and the image sensor may be converted to a sensor used for outputting signals, so as to sense the optical image information. According to different elements, the image sensor may be divided into two main types: charge coupled devices (CCDs) and complementary metal-oxide semiconductors (CMOSs). The optical element may refer to a component, such as a lens, that receives and adjusts an optical object to implement optical imaging. A lens is a lens group generally formed by one or more pieces of optical glass, and a basic unit of the lens is a concave lens, a convex lens, or a combination thereof.

A principle of acquiring image data by the imaging hardware may be that: a collected optical signal is transmitted to the image sensor inside the imaging hardware; the image sensor converts the optical signal to an electrical signal; and then digital quantization is performed on the electrical signal to obtain the image data.

The image application may provide a specific control or another trigger manner, and when a user triggers the trigger manner, such as pressing a "start to record" or "start to take picture" button of the apparatus, the image application may drive the imaging hardware to detect the frame of or the plurality of frames of depth of field image by means of the one or more character distances.

The character distance may be a focal distance, i.e., a distance between the apparatus and a focal plane of the apparatus wherein an object is properly focused. When the scene of the image includes a plurality of objects (i.e., service objects), the focal plane may locate in where an object is. Therefore, the character distance may be a distance between the apparatus and the service object. Different character distance may correspond with different depth of field. Here, a depth of field, also called focus range or effective focus range, is the distance between the nearest and farthest objects in a scene that appear acceptably sharp in an image. A depth of field image may be an image that reflects a depth of field of the scene, i.e., objects of different distances from the apparatus 300 may have different sharpness in the image. The sharpness of an object depends on how far the object is from a focus plane of the apparatus 300. Those objects that are within the depth of field are acceptably sharp, whereas those objects who are outside the depth of field appear blurry in the image. A depth of field image may be a preview image detected in a depth of field range. It may be saved in a non-transitory storage medium of the apparatus 300, or alternatively, as a preview image, it may be written into a buffer memory or cache, but is not truly generated as a final version of image data to store in the non-transitory storage medium of the apparatus 300.

The apparatus 300 may further operate under a multiple features state, which includes a predetermined number of different character distances (e.g., focal distance) of the apparatus. For example, the predetermine number of character distances may be an arithmetic sequence or a sequence of distances corresponding with distances between the apparatus and the objects in the scene. Under the multiple features state, when the user presses the "start to record" or "start to take picture" button of the apparatus, the apparatus may drive its imaging hardware to shoot a predetermined number of (i.e., the plurality of) frames of images respectively corresponding to the predetermined number of character distance. Since the predetermined number of character distance is a sequence of different numbers, each of the predetermined number of frames of images may corresponds with a different depth of field.

In a exemplary embodiment of the present disclosure, step 101 may include the following substeps:

driving the imaging hardware to multiple features states having the multiple character distances; and driving the imaging hardware to detect, in the multiple features states, the plurality of frames of depth of field image.

A service object may be one or more objects appear in the depth of field image that the image data generating method may process. For example, if the image is a street scene, the service object may be a building, a plant, or a few people appear in the image. The one or more objects may be distributed in different locations (with different distance from the apparatus) in the street scene, and can generally reflect light and transmit the light to the imaging hardware, so that the image data generated by the imaging hardware can reflect information of the service object.

In this embodiment of the present disclosure, the character distance may be a distance between the optical element and an external service object. For example, the optical element may be a lens in the apparatus 300.

In an exemplary implementation, the imaging hardware may have a motor that controls movement thereof, where the motor may move according to different current values. Every time the motor moves its location, the imaging hardware may be made to move for a small distance (that is, a step length), and the distance is measured in millimeters or micrometers. When the imaging hardware stays at a new location, the character distance may change, thereby performing imaging in the one or more character distances.

Step 102: Determining a target image area in each frame of the plurality of frames of depth of field image.

The apparatus may first divide each frame of the plurality frames of images into a plurality of areas. For example, the apparatus may use a grid to divide each frame into a predetermine number of areas. And then, from the plurality of areas, the apparatus may determine one or more target image area.

In an exemplary implementation, the apparatus may determine the target image area in the depth of field image every time the frame of depth of field image is detected and/or obtained, or the apparatus may determine the target image areas in all depth of field images when the depth of field images are detected and/or obtained completely, which is not limited in this embodiment of the present disclosure.

The target image area may be an image area whose correlation between pixels exceeds a preset correlation threshold. Here, the correlation between pixels is a measurement that reflects how sharp an image in the image area, i.e., whether an object in the image area are acceptably focused by the apparatus. For example, the correlation between pixels in an image area may be contrast, information entropy, grayscale gradient, or a combination thereof of the pixels in the image area. The higher the contrast, the information entropy, and/or the grayscale gradient, the higher the correlation between the pixels in the image area. The lower the contract, the information entropy, and/or the grayscale gradient, the lower the correlation between the pixels in the image area.

Taking the grayscale gradient as an example to measure the correlation, to identify a target image area, the apparatus 300 may traverse through the entire pixels in a frame of image and calculate grayscale gradient among the pixels in the image areas of the frame of image. The apparatus may determine that the correlation between pixels in an image area is small if the grayscale gradient (grayscale change) is small. On the other hand, the apparatus may determine that the correlation between pixels in the image area is large if the grayscale gradient is large. Thus based on the grayscale gradient, the apparatus 300 may identify, from a frame of depth of field image, one or more target image areas within which the correlation between pixels is above a preset correlation threshold. In actual implementation, this means a target image area includes a point where an object is sharply focused by the apparatus. Therefore, a target image area may be part or all of an object in an image that stands out from its surrounding area in the image, by shape, color, pattern, and/or brightness etc., so that the apparatus 300 may identify the target image area from the frame of depth of field image.

In an exemplary embodiment of the present disclosure, step 102 may include a substep of:

dividing each frame of the plurality frames of depth of field image into image areas.

Each frame of the plurality of frames of depth of field images may be divided in a consistent division manner, such as using a grid to evenly divide a frame into a predetermined number of image areas. Alternatively, each frame of the plurality of frames of depth of field images may also be divided in an inconsistent division manner, such as dividing a frame into image areas into various sizes and/or various shapes. Moreover, this embodiment of the present disclosure does not limit the manner, number and shapes (for example, a square, a circle, and a triangle) of the image areas divided in each frame of the plurality of frames of depth of field images.

In an example of this embodiment of the present disclosure, this substep may include:

dividing each frame of the plurality of frames of depth of field image into a first sub-area (first image sub-area) and a second sub-area (second image subarea). The first sub-area may further include a plurality of sub-sub-area, and the second sub-area may further include a plurality of sub-sub-area. Accordingly, the apparatus 300 may divide the first sub-area and the second sub-area into image areas under different resolutions.

In this embodiment of the present disclosure, the divided image area includes at least one of the first sub-area and the second sub-area. According to an example embodiment, size of the first sub-area may be larger than that of the second sub-area.

In one case, the first sub-area is located in a center location of each frame of the plurality of frames of depth of field image, and the second sub-area is located in a peripheral area (e.g., surrounding area) of the first sub-area. The apparatus may adopt a finer grid (i.e., a higher resolution in dividing sub-sub-areas) in the first sub-area than the second sub-area, so that the accuracy to distinguish variation of the depth of field at the center area in the depth of field image is higher, and the accuracy to distinguish the depth of field at the peripheral area in the depth of field image is lower.

Here, the accuracy to distinguish the depth of field may refer to a measurement that describes how small of a depth of field that the image may reflect.

Actual locations, area sizes, and the like of the center location and the peripheral location may be preselected by a technician or by a user skilled in the art according to actual situations, for example, a center may be located in a center of the depth of field image, and may also be located in inclined-left/inclined-right/top/bottom, or the like, which is not limited in this embodiment of the present disclosure.

In another case, the first sub-area is located in a golden ratio location of each frame of the plurality of frames of depth of field image (about 0.618), and the second sub-area is located in the remainder location in the frame, so as to increase depth of field precision of the golden ratio location.

In actual applications, because a user gets used to distributing the service object near the center location and the golden ratio location, the depth of field precision of the center location and the golden ratio location may be high, so as to detect the service object as far as possible.

Certainly, the division manner described above is just used as an example. In this embodiment of the present disclosure, another division manner may be set according to actual situations, for example, vertically and horizontally even division, which is also not limited in this embodiment of the present disclosure. Moreover, except the another division manner described above, a person skilled in the art may further use yet another division manner according to actual needs, which is also not limited in this embodiment of the present disclosure.

Moreover, except the first sub-area and the second sub-area, the divided image area may further include another image area. For example, four corners of the depth of field image may be divided into a third image area or the like, which is also not limited in this embodiment of the present disclosure.

Step 102 may further include a substep of calculating correlation between pixels in the image area for each frame of the plurality of frames of depth of field image.

If the correlation between the pixels is large, an image grayscale change is small, an image grads value is small and image entropy is also small. On the contrary, if the correlation between the pixels is small, the image grayscale change is large, the image grads value is large, and the image entropy is also large.

The image grayscale change may be calculated by means of a spectrum function. The spectrum function may be obtained, for example, by means of Fourier transformation.

Image data with a proper character distance includes more information, and people can better distinguish details therein. The details mean that the image data have a distinguishable edge, a very strong gray-level change exists locally, and gray-level transition is much stronger.

The grads value may be calculated by means of a gradient function such as a Tenengrad function, an energy gradient function, a Brenner function, and a variance function.

During image processing, the gradient function is often used to extract edge information. The image data with the proper character distance has an image that has a sharper edge, and the image data should have a greater gradient function value.

The image entropy may be obtained by means of an entropy function. The entropy function may be based on such a premise in which entropy of the image data with the proper character distance is greater than entropy of image data with an improper character distance (excessively short or excessively long).

Step 102 may further include a substep of extracting the image area whose correlation between the pixels exceeds the preset correlation threshold as the target image area.

Here, the correlation threshold may be preset. If the correlation between the pixels exceeds the correlation threshold, the apparatus 300 may determine that the image area includes the service object When the correlation of pixels is calculated, the apparatus may obtain image areas whose correlation exceed the correlation threshold, and determine these image area may have service objects. Correspondingly, the apparatus may set the image areas as the target image areas. The apparatus may also mark the target areas, for example, by establishing a mapping relationship between the character distance and the target image area.

Corresponding to the correlation threshold, an image grayscale threshold, an image gradient threshold, and an image entropy threshold may be set.

When the correlation exceeds the preset correlation threshold, the image grayscale change may be less than image grayscale threshold; the image gradient value may be less than the image gradient threshold; and the image entropy may be less than the image entropy threshold.

As introduced above, when the predetermined number of character distance is corresponding with a N number of motor steps in the lens of the apparatus, each pair of two adjacent numbers has a predetermined step length therebetween, the apparatus may take the plurality of frames of images according to the predetermined number of character distances. To this end, the apparatus may perform a test for the depth of field to a frame of image according to the predetermined step length. With the predetermined step length the apparatus may take N steps to go through and/or traverse the entire frame of image. An objective of the first time performance of the depth of field traversing according to the N step lengths is to detect whether in N different depth of field distances have the service object, instead of generating N-frame image data.

After the depth of field traversing is completed, the apparatus may obtain information about which depth of field distances having the service object and an approximate location of the service object in a scene.

It should be noted that, in a frame of depth of field image, there may exist no target image area whose correlation exceeds the preset correlation threshold; or there may be only one target image area whose correlation exceeds the preset correlation threshold; or there may be multiple target image areas whose correlation exceeds the preset correlation threshold.

Step 103: Separately setting focus areas of each frame of the plurality of frames of depth of field images in the target image area.

In this step, for each of the plurality of frames of depth of field images, the apparatus may set and/or locate focus areas of the frame locates in the target image areas. For example, if in a frame there is only one target image area, the apparatus may determine that the focus area is the target image area. If the frame includes multiple target areas and locations of these multiple areas concentrate in one area of the image, the apparatus may locate the focus area in a center of the area. The apparatus may mark the focus area for each of the plurality of frames.

The focus area may refer to that auto focusing may be performed, in a range of a specified focus point, on the specified focus point by the external service object.

After depth of field detection is performed once, which area (that is, the depth of field) on different depths of field has the service object can be acquired.

Therefore, when the image data is officially generated, the focus areas are sequentially directed to the target image area that is labeled to have the service object, and the imaging hardware is directly dragged to a depth of field (a character distance) corresponding to the target image area, which can implement initial focusing, and reduce focusing time when the image data is generated.

In an exemplary embodiment of the present disclosure, step 103 may include:

a substep of setting a target center of the focus area of each frame of the plurality of frames of depth of field image to a center of a combined area, where the combined area includes the target image area.

In this embodiment of the present disclosure, one or more target image areas may be combined into the combined area in a situation where, for example, the target image areas are adjacent with respect to each other and/or are concentrated in an area of the frame of image, and the target center of the focus area is set to the center of the combined area.

Or alternatively to the substep above of step 103: setting the target center of the focus area of each frame of the plurality of frames of depth of field image to a center of the target image area.

In this embodiment of the present disclosure, in a situation where, for example, when the target image areas are disperse (or scattered around in the image, not concentrated within a small area), in order to further increase a coverage rate of the target image areas, the apparatus 300 may individually and separately place a focus area over the center of each of the target image areas.

Step 104: Driving the imaging hardware to generate the frame of or the plurality of frames of image data according to the one or more character distances and the focus areas.

In this step, the apparatus may obtain and/or reconstruct an all-focused image of the scene by combining the plurality of frame of depth of field images into one image, wherein in the all-focused image, every detected service object are sharply focused, although their respective character distance may be different.

The reconstruction of the all-focused image may include a process to combine the images with proper quotiety, details of which is introduced below:

Assuming that for the N step length, the apparatus takes N frames of the depth of field images. The N frames of images forms a group I. Because the N frame of depth of field images corresponds to the same scene and is taken by the same apparatus, each of the N frames of depth of field images may include the same matrix of pixels. Assuming each frames of images includes x0 pixels at horizontal direction, y0 pixels at vertical direction, any pixel at location (x,y) in one frame i may correspond to another pixel in any other frame j in the N frames, wherein j=1, 2 ... i−1, ... N.

The apparatus may determine for each of the N frames of depth of field images, whether the pixel at location (x, y) belongs to a target image area. Accordingly, the apparatus may determine, among the N frames of depth of field images and for each pixels at location (x, y), M frames of the depth of field images includes a target image area that includes the pixel.

If M=0, the apparatus may determine that no target image area is at (x, y), i.e., there is no service object at (x, y).

Accordingly, the apparatus may determine that the value of the pixel at (x, y) is an average value of the N pixels at (x, y) of the N frames:

$$J_{(x,y)} = \frac{\sum_{i=1}^{N} I_i(x, y)}{N}$$

wherein $I_i(x, y)$ is the value of the pixel at (x, y) location of the ith frame of the N frames of depth of field image; $J_{(x,y)}$ is the value of the pixel at (x, y) location in the all-focused image.

If M>0, the apparatus may determine that at least one target image area is at (x, y), i.e., there are M frames of the depth of field images include a service object at (x, y). Accordingly, the apparatus may determine that the value of the pixel at (x, y) is an average value of the M pixels at (x, y) of the M frames:

$$J_{(x,y)} = \frac{\sum_{i=1}^{M} K_i(x, y)}{M}$$

wherein $K_i(x, y)$ is the value of the pixel at (x, y) location of the ith frame among the M frames of depth of field image.

The apparatus may traverse through the entire x0×y0 matrix of pixels of the all-focused image to calculate the value of each pixel, and then obtain the all-focused image.

In an exemplary embodiment of the present disclosure, step 104 may include the following substeps:

driving the imaging hardware to move to the multiple character distances;

driving the imaging hardware to place a focus area on the center of each target image areas that the apparatus detected in the current characteristic distance, performing focusing processing in the focus areas, and generating the image data.

In this embodiment of the present disclosure, fine focusing may be performed in the focus area, and the image data is generated after the focusing is completed.

Certainly, except performing the focusing processing, the imaging hardware may further perform other processing, for example, setting the number of the generated image data, setting an image size, setting a color effect, setting ISO, setting exposure, setting white balance, setting saturation, setting contrast, and setting sharpness, which is not limited in this embodiment of the present disclosure.

In actual applications, the service object (a scene) transmits an optical image generated by means of a lens of the imaging hardware to a surface of the image sensor, converts the optical image into the electrical signal, and converts the electrical signal to a digital image signal by means of analog-digital conversion (A/D); and a digital signal processing (DSP) chip or a coding library compresses and inverts the digital image signal into a format of an image file to store the image file.

In an exemplary embodiment of the present disclosure, the method embodiment may further include:

Presenting the plurality of frames of image data.

In this embodiment of the present disclosure, the generated the frame of or the plurality of frames of image data may be presented, so that the user selects image data of needed depth of field.

In this embodiment of the present disclosure, imaging hardware is driven to detect the frame or the plurality of frames of depth of field image by means of one or more character distances, so as to find one or more target image areas; focus areas are respectively set in the one or more target image areas; and the imaging hardware is driven to generate the frame of or the plurality of frames of image data in one shot. In this process, a user just needs to complete a generation operation once to make a selection on different character distances in image data without performing operations of starting an image application and driving imaging hardware again, which greatly improves operational simplicity and reduces time taken.

It should be noted that, for ease of description, the method embodiments are described as a series of action combinations. However, a person skilled in the art should understand that this embodiment of the present disclosure is not limited to the described sequence of the actions, because some steps may be performed in another sequence or performed at the same time according to this embodiment of the present disclosure. In addition, a person skilled in the art should also understand that all the exemplary embodiments described in this specification belong to exemplary embodiments, and the involved actions are not necessarily mandatory to this embodiment of the present disclosure.

Figure 2:
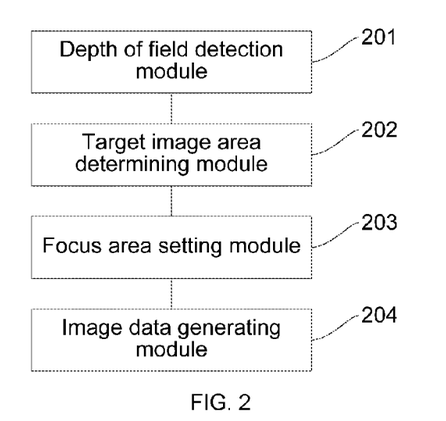
FIG. 2 is a structural block diagram of an exemplary embodiment of an image data generating apparatus according to the present disclosure.

FIG. 2 shows a structural block diagram of an exemplary embodiment of an image data generating apparatus according to the present disclosure, and the apparatus may specifically include the following modules:

A depth of field detection module 201, configured to drive imaging hardware to detect a plurality of frames of depth of field image by means of multiple character distances;

A target image area determining module 202, configured to determine a target image area in an each frame of the plurality of frames of depth of field image, where the target image area is an image area whose correlation between pixels exceeds a preset correlation threshold;

A focus area setting module 203, configured to set a focus area of each frame of the plurality of frames of depth of field image in the target image area; and An image data generating module 204, configured to drive the imaging hardware to generate the plurality of frames of image data according to the multiple character distances and the focus areas.

In an exemplary implementation, the imaging hardware may have an optical element, and the character distance may be a distance between the optical element and an external service object.

In an exemplary embodiment of the present disclosure, the depth of field detection module 201 may include the following submodules:

A first driving submodule, configured to drive the imaging hardware to multiple features states having the multiple character distances; and A second driving submodule, configured to drive the imaging hardware to detect, in the multiple features states, the plurality of frames of depth of field image.

In an exemplary embodiment of the present disclosure, the target image area determining module 202 may include the following submodules:

A dividing submodule, configured to divide each frame of the plurality of frames of depth of field image into an image area;

A correlation calculating submodule, configured to calculate correlation between pixels in the image area for each frame of the plurality of frames of depth of field image; and An extracting submodule, configured to extract the image area whose correlation between the pixels exceeds the preset correlation threshold as the target image area.

In an example of this embodiment of the present disclosure, the dividing submodule may include the following submodules:

An area dividing submodule, configured to divide each frame of the plurality of frames of depth of field image into a first sub-area and a second sub-area.

The first sub-area is located in a center location of each frame of the plurality of frames of depth of field image. The second sub-area is located in the peripheral area and/or surrounding area of the first sub-area. Alternatively, the first sub-area is located in a golden ratio location in each frame of the plurality of frames of depth of field image. Accordingly, the second sub-area is located in the remainder area of each frame. The first sub-area and the second sub-area may also include a plurality of sub-sub-areas.

In a exemplary embodiment of the present disclosure, the focus area setting module 203 may include the following submodules:

A first center setting submodule, configured to set a target center of the focus area of each frame of the plurality of frames of depth of field image to a center of a combined area, where the combined area includes neighboring target image areas in a same frame of depth of field image; and A second center setting submodule, configured to set the target center of the focus area of each frame of the plurality of frames of depth of field image to a center of the target image area.

In an exemplary embodiment of the present disclosure, the image data generating module 204 may include the following submodules:

A third driving submodule, configured to drive the imaging hardware to the multiple features states having the multiple character distances; and A fourth driving submodule, configured to drive the imaging hardware to perform focusing processing in the focus area corresponding to a current feature area, and generate the image data.

In an exemplary embodiment of the present disclosure, the apparatus may further include the following module:

An image data presentation module, configured to present the plurality of frames of image data and reconstruct the plurality of frames of image data into an all-focused image.

The apparatus embodiment is substantially similar to the method embodiments and therefore is only briefly described, and reference may be made to the method embodiments for the associated part.

The exemplary embodiments in this specification are all described in a progressive manner. Description of each of the exemplary embodiments focuses on differences from other embodiments, and reference may be made to each other for the same or similar parts among respective embodiments.

A person skilled in the art should understand that the exemplary embodiments of the present disclosure may be provided as a method, an apparatus, or a computer program product. Therefore, the exemplary embodiments of the present disclosure may use a form of hardware only embodiments, software only embodiments, or embodiments with a combination of software and hardware. Moreover, the exemplary embodiments of the present disclosure may use a form of a computer program product that is implemented on one or more computer-usable storage media (including but not limited to a disk memory, a CD-ROM, an optical memory, and the like) that include computer usable program code.

The exemplary embodiments of the present disclosure are described with reference to the flowcharts and/or block diagrams of the method, the terminal device (system), and the computer program product according to the exemplary embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions that are executed on the computer or the other programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the exemplary embodiments of the present disclosure.

Finally, it should be further noted that in the present specification, the relational terms such as first and second are used only to differentiate an entity or operation from another entity or operation, and do not require or imply any actual relationship or sequence between these entities or operations. Moreover, the terms "include", "include", and any variants thereof are intended to cover a non-exclusive inclusion. Therefore, in the context of a process, method, object, or device that includes a series of elements, the process, method, object, or terminal device not only includes such elements, but also includes other elements not specified expressly, or may include inherent elements of the process, method, object, or terminal device. Unless otherwise specified, an element limited by "include a/an . . . " does not exclude other same elements existing in the process, the method, the object, or the terminal device that includes the element.

The foregoing describes an image data generating method and an image data generating apparatus according to the present disclosure in detail. Specific examples are used herein to explain principles and implementation manners of the present disclosure, and description of the following embodiments is only used to help understand the method of the present disclosure and core concept thereof. Meanwhile, a person of ordinary skill in the art may make variations in specific implementation manners and the application scope according to the conception of the present disclosure. In conclusion, content of the present description should not be understood as a limitation to the present disclosure.

The invention claimed is:

1. An electronic device, comprising:
   imaging hardware;
   a storage medium including a set of instructions; and
   a processor in communication with the storage medium and the imaging hardware, wherein when executing the set of instructions, the processor is configured to direct the electronic device to:
      obtain, from the imaging hardware, a first plurality of frames of preview images of a scene, each frame associated with a character distance of a plurality of character distances of the electronic device;
      for each of the first plurality of frames of preview images,
         determine at least one target image area, wherein each of the at least one target image area comprises an image area on which an object in the scene is sharply focused; and
         set a focus area according to the at least one target image area;
      generate, from the imaging hardware, a second plurality of frames of images of the scene, each frame based on fine-focusing on the corresponding focus area and corresponding character distance; and
      generate an all-focused image comprising a matrix of target pixels from the second plurality of frames of images, wherein to generate the all-focused image, the processor is configured to direct the device to, for each target pixel:
         in response to identifying that one or more frames of images among the second plurality of frames of images each includes a target image area that contains a pixel corresponding to the target pixel, determine a value of the target pixel according to pixel values of pixels in the identified one or more frames of images corresponding to the target pixel; and
         in response to determining that the second plurality of frames of images do not include a frame having a target image area that includes a pixel corresponding to the target pixel, determine a value of the target pixel according to pixel values of pixels in the second plurality of frames of images corresponding to the target pixel.

2. The electronic device according to claim 1, wherein the imaging hardware comprises an optical element, and each character distance is a distance between the optical element and a focus plane in the scene.

3. The electronic device according to claim 1, wherein to obtain the first plurality of frames of preview images the processor is configured to drive the imaging hardware to:
   take a depth of field image at each of the plurality of character distances.

4. The electronic device according to claim 1, wherein to determine the at least one target image area in a frame of image the processor is configured to direct the electronic device to:
   divide the frame of the image into at least one image area;
   calculate correlation between pixels in one of the at least one image area; and determine the one of the at least one image area as one of the at least one target image area when the correlation between the pixels in the one of the at least one image area exceeds a preset correlation threshold.

5. The electronic device according to claim 4, wherein the correlation between pixels in the one of the at least one image area comprises a measurement reflecting image sharpness.

6. The electronic device according to claim 4, wherein the at least one image area comprises a first sub-area and a second sub-area,
wherein the first sub-area is located in a center location of the frame of image, and the second sub-area is located in peripheral location of the center location; or
the first sub-area is located in a golden ratio location of the frame of image, and the second sub-area is located in a location in the at least one image area other than the first sub-area.

7. The electronic device according to claim 1, wherein to set the focus area according to the at least one target image area, the processor is further configured to direct the electronic device to:
set a target center of the focus area to a center of a combined area of the at least one target image area; or
set a target center of the focus area to a center of each of the at least one target image area.

8. A method for generating image data, comprising:
driving imaging hardware of an electronic device to detect a first plurality of frames of preview images of a scene, each frame associated with a character distance of a plurality of character distances of the electronic device;
for each of the first plurality of frames of preview images, determining at least one target image area, wherein each of the at least one target image area comprises an image area on which an object in the scene is focused; and
setting a focus area according to the at least one target image area;
driving the image hardware to generate a second plurality of frames of images of the scene, each frame based on fine-focusing on the corresponding focus area and corresponding character distance; and
generating an all-focused image comprising a matrix of target pixels from the second plurality of frames of images, comprising:
in response to identifying that one or more frames of images among the second plurality of frames of images each includes a target image area that contains a pixel corresponding to the target pixel, determining a value of the target pixel according to pixel values of pixels in the identified one or more frames of images corresponding to the target pixel; and
in response to determining that the second plurality of frames of images do not include a frame having a target image area that includes a pixel corresponding to the target pixel, determining a value of the target pixel according to pixel values of pixels in the second plurality of frames of images corresponding to the target pixel.

9. The method according to claim 8, wherein the imaging hardware comprises an optical element, and each character distance is a distance between the optical element and a focus plane in the scene.

10. The method according to claim 8, wherein obtaining the first plurality of frames of preview images comprises:
taking a depth of field image at each of the plurality of character distances.

11. The method according to claim 8, wherein determining the at least one target image area in a frame of image comprises:
dividing the frame of the image into at least one image area;
calculating correlation between pixels in one of the at least one image area; and
determining the one of the at least one image area as one of the at least one target image area when the correlation between the pixels in the at least one image area exceeds a preset correlation threshold.

12. The method according to claim 11, wherein the correlation between pixels in the one of the at least one image area comprises a measurement reflecting image sharpness.

13. The method according to claim 11, wherein the at least one image area comprises a first sub-area and a second sub-area,
wherein the first sub-area is located in a center location of the frame of image, and the second sub-area is located in peripheral location of the center location; or
the first sub-area is located in a golden ratio location of the depth of field image, and the second sub-area is located in a location in the at least one image area other than the first sub-area.

14. The method according to claim 8, wherein setting the focus area according to the at least one target image area comprises:
setting a target center of the focus area to a center of a combined area of the at least one target image area; or
setting a target center of the focus area to a center of each of the at least one target image area.

* * * * *